United States Patent [19]

El-Ghatta et al.

[11] 4,048,291

[45] Sept. 13, 1977

[54] PROCESS FOR PREPARING HYDROXYLAMMONIUM SALTS

[75] Inventors: Hussain El-Ghatta, Chur, GR; Johann Karl Forrer, Domat-Ems, GR, both of Switzerland

[73] Assignee: Inventa AG fur Forschung und Patentverwertung, Zurich, Switzerland

[21] Appl. No.: 573,854

[22] Filed: May 2, 1975

[30] Foreign Application Priority Data

May 10, 1974 Switzerland .......................... 6406/74

[51] Int. Cl.$^2$ ............................................ C01B 21/14
[52] U.S. Cl. .................................... 423/387; 423/388; 423/395

[58] Field of Search ................ 423/387, 388, 385, 395

[56] References Cited

U.S. PATENT DOCUMENTS

| 2,823,101 | 2/1958 | Jockers et al. | 423/387 |
| 3,856,924 | 12/1964 | Kartte et al. | 423/387 |

Primary Examiner—Earl C. Thomas
Attorney, Agent, or Firm—Bierman & Bierman

[57] ABSTRACT

A process for making hydroxyl ammonium salts by hydrogenation of nitric oxide in an acid medium in the presence of a platinum catalyst, wherein the catalyst contains 15 to 50 atom percent of selenium and the acid medium is at least 2N during the reaction. A new catalyst and method of making it are also disclosed.

11 Claims, No Drawings

PROCESS FOR PREPARING HYDROXYLAMMONIUM SALTS

This application claims the priority of Swiss Application No. 6406/74 filed May 10, 1974.

Catalysts containing platinum metal which catalyze the hydrogenation of nitric oxide in an acid medium to give hydroxylammonium salts are known. In addition to the desired hydroxylammonium salts, however, a substantial part of the nitric oxide is reduced to ammonium salts, nitrogen and nitrous oxide. These undesired by-products reduce the yield of the desired product and interfere with the economy of the commercial process. It has been suggested that a more selective reduction of nitric oxide to give hydroxylamine in an acid medium can be carried out. The use of catalysts containing platinum metal in which the catalysts are "poisoned" by the presence of elements As, Se, Sb, Te, S or Bi, has been disclosed by German Pat. No. 956,038, and the use of the elements Hg, As, Sb, Bi, has been taught by Japanese Patent Publication No. 54 750/1966.

It has now been found the hydrogenation of nitric oxide in acid medium leads almost exclusively to the desired hydroxylammonium salts if selenium-modified platinum metal catalysts are employed as catalysts and if the hydrogenation of the nitric oxide is carried out at acid concentrations of at least 2N. Accordingly, the present invention relates to a process for the preparation of such salts by catalytic hydrogenation of nitric oxide in an acid medium wherein platinum containing catalysts having 15 to 50 atom percent of selenium, based on the amount of platinum, are employed and the hydrogenation of the nitric oxide is carried out at an acid concentration of at least 2N. Preferably, 20 to 30 atom percent of selenium, based on the platinum present, is used.

The modification of the catalysts containing platinum metal with selenium is carried out by suspending the platinum catalyst in an acid. The acid is preferably 0.5 to 8N and most preferably 3 to 5N. The most suitable acid is sulfuric. Thereafter, while stirring, first nitrogen gas and then hydrogen is passed into the suspension. The selenium is then added in an aqueous or acid solution. In the latter case, the acid is preferably the same as that in which the platinum catalyst is suspended and the concentration is of the same normality. Dropwise addition of the selenium in sulfuric acid solution with stirring and the passing in of hydrogen has been found most suitable.

As catalysts containing platinum metal, there may be employed the preparations conventionally used for the catalytic hydrogenation of nitric oxide, such as 0.5–5% Pt on activated carbon or graphite. As selenium compounds there may be employed, among others, selenous acid, selenium dioxide, or salts of selenous acid, preferably alkali salts, such as sodium salt.

After passing hydrogen in for a period of at least 10 minutes, the catalyst may be employed directly, without intermediate isolation, for the hydrogenation of NO. It is advisable to adjust the normality of the acid present to 3 to 8N, preferably 4 to 6N, before commencement of the reaction. The acid concentration should be maintained at at least 2N during the course of the reaction. As an alternative, the catalyst can be isolated without the necessity of any special precautions, and then used at a later time for the desired reaction under the foregoing conditions.

In addition to their selective catalytic action, the selenium-modified platinum catalysts of this invention also show an increased conversion activity in the hydrogenation of nitric oxide in comparison with conventional, unmodified platinum catalysts. The commercial advantage of this process is that a specific process has been found wherein the nitric oxide is hydrogenated exclusively to give hydroxylamine virtually without the formation of by-products. Consequently, it demonstrates greatly increased economy in comparison with previously known processes.

The following Examples illustrate the invention.

EXAMPLE 1

2 liters of 4.6N sulfuric acid is placed in a 2-liter reaction vessel equipped with a stirrer. 14 g of 1.0% platinum on activated carbon is added as the catalyst. About 10 liters of $N_2$ is passed into the stirred suspension in $\frac{1}{4}$ hour (the suspension being at a temperature of 30° C), followed by about 20 liters of $H_2$ over a period of about 15 minutes. 16 mg of $SeO_2$ (corresponding to 20 atom percent of selenium based on the platinum) is dissolved in 100 ml of 4.6N sulfuric acid and added to the suspension, which is supplied with $H_2$ and stirred. $H_2$ then continues to be passed into the suspension for $\frac{1}{4}$ hour at 30° C.

For nitric oxide hydrogenation, a mixture of 25 standard liters of nitric oxide and 75 standard liters of $H_2$ per hour are then passed in at 40° C. The acid concentration in the reaction vessel is kept constant at about 2N by hourly removal of product and addition of sulfuric acid (about 4.8N).

Table 1 shows the average activity, selectivity and yield of the process according to the invention for an operating time of 40 hours, as well as the corresponding details, for comparison, of a test in which the same catalyst was used under the same conditions but without modification with selenium compounds.

Table 1

| | Conversion of nitric Oxide (%) | Selectivity $(NH_3OH)_2SO_4$ $(NH_4)_2SO_4$ | Yield % | | | Volume-time yield $g(NH_3OH)_2SO_4$ |
|---|---|---|---|---|---|---|
| | | | $(NH_3OH)_2SO_4$ | $(NH_4)_2SO_4$ | Total of $N_2O+N_2$ | L · h |
| Pt catalyst modified with selenium (20 atoms % selenium based on platinum), in accordance with Example 1 | 90.5 | ∞ | 99.5 | 0 | 0.5 | 41.0 |
| Comparison test | | | | | | |

Table 1-continued

| | Conversion of nitric Oxide (%) | Selectivity (NH3OH)2SO4 / (NH4)2SO4 | Yield % (NH3OH)2SO4 | (NH4)2SO4 | Total of N2O+N2 | Volume-time yield g(NH3OH)2SO4 / L·h |
|---|---|---|---|---|---|---|
| Unmodified Pt catalyst | 82.5 | 5.5 | 82.0 | 14.9 | 2.0 | 30. |

EXAMPLE 2

(Comparison example, at an acid concentration below 2N)

Under otherwise the same conditions as those given in Example 1, the concentration of the acid was kept constant at 1N during the reaction. The results are given in Table 2 hereunder.

Table 2

| | Conversion of nitric oxide (%) | Selectivity NH4)2SO4 / (NH4)2SO4 | Yield % (NH3OH)2SO4 | (NH4)2SO4 | Total of N2O+N2 | Volume-time yield g(NH3OH)2SO4 / L·h |
|---|---|---|---|---|---|---|
| Pt catalyst modified with selenium (20 atoms % selenium based on platinum), in accordance with Example 1 | 75.3 | 6.1 | 83.0 | 13.6 | 3.4 | 28.6 |
| Unmodified Pt catalyst | 80.0 | 4.55 | 81.0 | 17.8 | 1.2 | 29.6 |

Although only a limited number of embodiments have been specifically disclosed, the invention is, nonetheless, to be broadly construed and not to be limited except by the character of the claims appended hereto.

What is claimed is:

1. In a process for the preparation of hydroxyl ammonium salts by hydrogenation of nitric oxide in an acid medium in the presence of a platinum conatining catalyst, the improvement which comprises said catalyst containing 15 to 50 atom percent of selenium based on said platinum, and said acid medium having a concentration of at least 2N throughout said hydrogenation.

2. A process according to claim 1 wherein said catalyst contains 20 to 30 atom percent of selenium.

3. A process according to claim 1 wherein said acid is sulfuric.

4. A process according to claim 1 wherein said catalyst contains 0.5 to 5% by weight of platinum.

5. A process according to claim 4 wherein said catalyst is on an inert carrier.

6. A process according to claim 5 wherein said carrier is activated carbon or graphite.

7. A process for the production of hydroxy ammonium salts comprising suspending a platinum-containing catalyst in a first acid, passing nitrogen gas into the suspension, then passing hydrogen gas into the suspension, adding 15 to 50 atom percent of selenium based on said platinum to said suspension, passing hydrogen into said suspension to form a product, adjusting the normality of the product to 3 to 8N prior to reaction, contacting said product with nitric oxide, maintaining said noramlity at at least 2N throughout said reaction, whereby said hydroxyl ammonium salts are formed.

8. A process according to claim 7 wherein said normality prior to said reaction is 4 to 6N.

9. A process according to claim 7 wherein said catalyst contains 0.5 to 5% platinum.

10. A process according to claim 9 wherein said catalyst is on an inert carrier.

11. A process according to claim 10 wherein said carrier is activated carbon or graphite.

* * * * *